United States Patent
Aaron (10) Patent No.: US 8,255,985 B2
(45) Date of Patent: Aug. 28, 2012

(54) METHODS, NETWORK SERVICES, AND COMPUTER PROGRAM PRODUCTS FOR RECOMMENDING SECURITY POLICIES TO FIREWALLS

(75) Inventor: Jeffrey Aaron, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1412 days.

(21) Appl. No.: 11/598,490

(22) Filed: Nov. 13, 2006

(65) Prior Publication Data

US 2008/0115205 A1    May 15, 2008

(51) Int. Cl.
*H04L 29/06*    (2006.01)

(52) U.S. Cl. ............... 726/11; 726/12; 726/13; 726/14; 726/15; 713/151; 713/152; 713/153

(58) Field of Classification Search .................... 726/11
See application file for complete search history.

(56) References Cited

U.S. PATENT DOCUMENTS

| | | | |
|---|---|---|---|
| 6,715,084 B2* | 3/2004 | Aaron et al. | 726/23 |
| 2003/0236990 A1* | 12/2003 | Hrastar et al. | 713/200 |
| 2007/0256133 A1* | 11/2007 | Garbow et al. | 726/26 |
| 2008/0022384 A1* | 1/2008 | Yee et al. | 726/11 |

* cited by examiner

*Primary Examiner* — Longbit Chai
(74) *Attorney, Agent, or Firm* — Myers Bigel Sibley & Sajovec, P.A.

(57) ABSTRACT

Recommending a security policy to a firewall, includes receiving a request from a firewall for a recommendation as to whether the firewall should allow or block a detected present communication for which the firewall does not have an existing security policy. Information about past blocked and allowed communications at other firewalls on a network is searched to identify past communications that are similar to the present communication. The identified past communications are assigned a respective positive or negative vote. A positive vote indicates a past communication was allowed and a negative vote indicates a past communication was not allowed. A positive recommendation is sent to the requesting firewall to allow the present communication if the positive votes outnumber the negative votes, and a negative recommendation is sent to the requesting firewall to block the present communication if the negative votes outnumber the positive votes.

8 Claims, 3 Drawing Sheets

METHODS, NETWORK SERVICES, AND COMPUTER PROGRAM PRODUCTS FOR RECOMMENDING SECURITY POLICIES TO FIREWALLS

FIELD OF THE INVENTION

The present invention relates generally to communications networks and, more particularly, to firewalls for communications networks.

BACKGROUND OF THE INVENTION

Conventionally, firewalls are located at network or sub-network perimeter points such as gateways or routers/switches protecting servers and consist of one or more programs configured to protect the resources of a network or sub-network from users outside the network. For example, an enterprise with an intranet that allows its workers access to the Internet may utilize a firewall to prevent outsiders from accessing data resources on the intranet and for controlling what Internet resources enterprise users have access to. Conventionally, a firewall examines each network packet to determine whether to forward the packet to its destination. For mobile users, firewalls may be configured to allow remote access to a private network via secure logon procedures and authentication certificates, etc. Firewalls may alternately or additionally be located directly on end user devices such as computing devices, cell phones and other wireless devices, etc.

By blocking unauthorized communications into and out of a network, firewalls protect against hackers who may try and compromise network security by installing unauthorized applications on or otherwise attacking one or more network devices. These unauthorized applications may allow a hacker to obtain private and/or sensitive information from one or more network devices (e.g., passwords, credit card numbers, social security numbers, web sites visited, etc.). Other types of attacks can cause network devices to crash or malfunction, be unable to communicate, or lead to data loss/corruption. Although effective in thwarting hackers, firewalls can present problems to legitimate network users by blocking communications of authorized applications.

Configuring firewall blocking rules for users of a network can be a difficult challenge. Optimal firewall configuration generally requires specific expertise to avoid oversimplification or configurations that are too conservative or too liberal. Oversimplification can result in the lack of customization for specific users, which may not be desirable. Conservative configurations may result in too many blocked communications, and liberal configurations may result in less than sufficient blocked communications, both of which may not be desirable.

SUMMARY OF THE INVENTION

Embodiments of the present invention provide methods, network services, and computer program products that recommend security policies to firewalls, wherein recommendations are made based upon the collective "wisdom" of a large group of diverse users. According to some embodiments of the present invention, a method of recommending a security policy to a firewall, includes receiving a request from a firewall for a recommendation as to whether the firewall should allow or block a detected present communication for which the firewall does not have an existing security policy or rule that addresses whether to block or allow the detected present communication. Responsive to receiving the request, information about past blocked and allowed communications at other firewalls on the network (and/or on other networks) are searched to identify past communications that are similar to the present communication. The identified past communications are assigned a respective positive or negative vote, wherein a positive vote indicates a respective past communication was allowed through a firewall on the network and wherein a negative vote indicates a past communication was not allowed through a firewall on the network. A positive recommendation is sent to the requesting firewall to allow the present communication if the positive votes outnumber the negative votes for similar past communications, and a negative recommendation is sent to the requesting firewall to block the present communication if the negative votes outnumber the positive votes for similar past communications. According to some embodiments of the present invention, the strength of a positive recommendation may be proportional to how many positive votes outnumber the negative votes (e.g., the absolute value of the sum) and the strength of a negative recommendation is proportional to how many negative votes outnumber the positive votes (e.g., the absolute value of the sum).

According to some embodiments of the present invention, a network service, in response to receiving a request from a firewall, recommends whether to block or allow a particular communication (and future similar communications). For example, an agent at a firewall is configured to detect a communication for which the firewall does not have a policy (i.e., the firewall rules do not address whether to block or allow the communication). The agent collects various information about a communication and communicates this information to the network service with a request for a recommendation.

According to some embodiments of the present invention, the network service includes a voting engine, a recommendation engine, and a database. The database stores information gathered from various firewalls about past communications and also includes analysis rules and algorithms, such as policy-to-vote conversion rules, voting rules, context-generation rules, pattern matching methods, threshold-based methods, etc. The database may also be used to log information about recommendations sent to requesting firewall agents by the network service.

In particular, the voting engine serves as means for gathering information from a large group of firewalls about past blocked and allowed communications. The voting engine categorizes gathered information about past allowed and blocked firewall communications and identifies past communications that are similar to a present communication for which a recommendation is being sought by a firewall.

The voting engine also assigns a respective positive or negative vote to identified past similar communications. A positive vote indicates a respective past communication was allowed through a firewall and a negative vote indicates a past communication was not allowed through a firewall. The voting engine tallies the positive and negative votes for identified past similar communications and these results serve as the basis for future recommendations regarding whether to block or allow future communications at a firewall. For example, if a firewall requests a recommendation whether to block or allow a particular communication, and if the vote tally for similar past communications has negative votes outnumbering positive votes, a recommendation to block the present communication will likely be sent to the requesting firewall.

The recommendation engine serves as means for searching information about past blocked and allowed communications at other firewalls on the network to identify past communications that are similar to the present communication. The recommendation engine makes a recommendation based on a tallied vote count for these past communications. According to embodiments of the present invention, the recommendation engine selects a best-match context for a recommendation request, searches for similar relevant information, processes that information, and provides a recommendation within that context.

Agents at requesting firewalls are configured to implement the recommendations of the recommendation engine, or at least to consider the recommendations in making a policy determination. For example, an agent modifies the blocking rules of a respective firewall to block or allow a present communication and future attempts by this and similar types of communications. Alternately, an agent factors the recommendation into its policy determination method and accordingly modifies the policy rules of a respective firewall. Note that in some cases the agent functionality can be part of the respective firewall.

Other methods, systems and/or computer program products according to embodiments of the invention will be or become apparent to one with skill in the art upon review of the following drawings and detailed description. It is intended that all such additional methods, systems, and/or computer program products be included within this description, be within the scope of the present invention, and be protected by the accompanying claims.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF EMBODIMENTS OF THE INVENTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, systems (e.g., network services), and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of embodiments of the present invention may also be written in other programming languages, such as, but not limited to, interpreted languages. Some modules or routines may be written in assembly language or even microcode to enhance performance and/or memory usage. Embodiments of the present invention are not limited to a particular programming language. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for recommending security policies to firewalls, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

The term "agent", as used herein, refers to a program (or programs) that executes on a device (e.g., a device hosting a firewall) and that gathers information and/or performs some service, typically without requiring a user's presence or knowledge.

The term "firewall", as used herein, refers to any type of firewall including, but not limited to, "network firewalls" located at the edge of a communications network, firewalls located at gateways, firewalls located in routers/switches, border gateway controllers, and host firewalls located on a server and/or on a user's device such as a computing device (e.g., PC, etc.), wireless device, etc. The location of a firewall is not intended to be limiting in any respect to embodiments of the present invention. Further, the inclusion of a firewall in another device or entity is not intended to be limiting in any respect to embodiments of the present invention.

Figure 1:
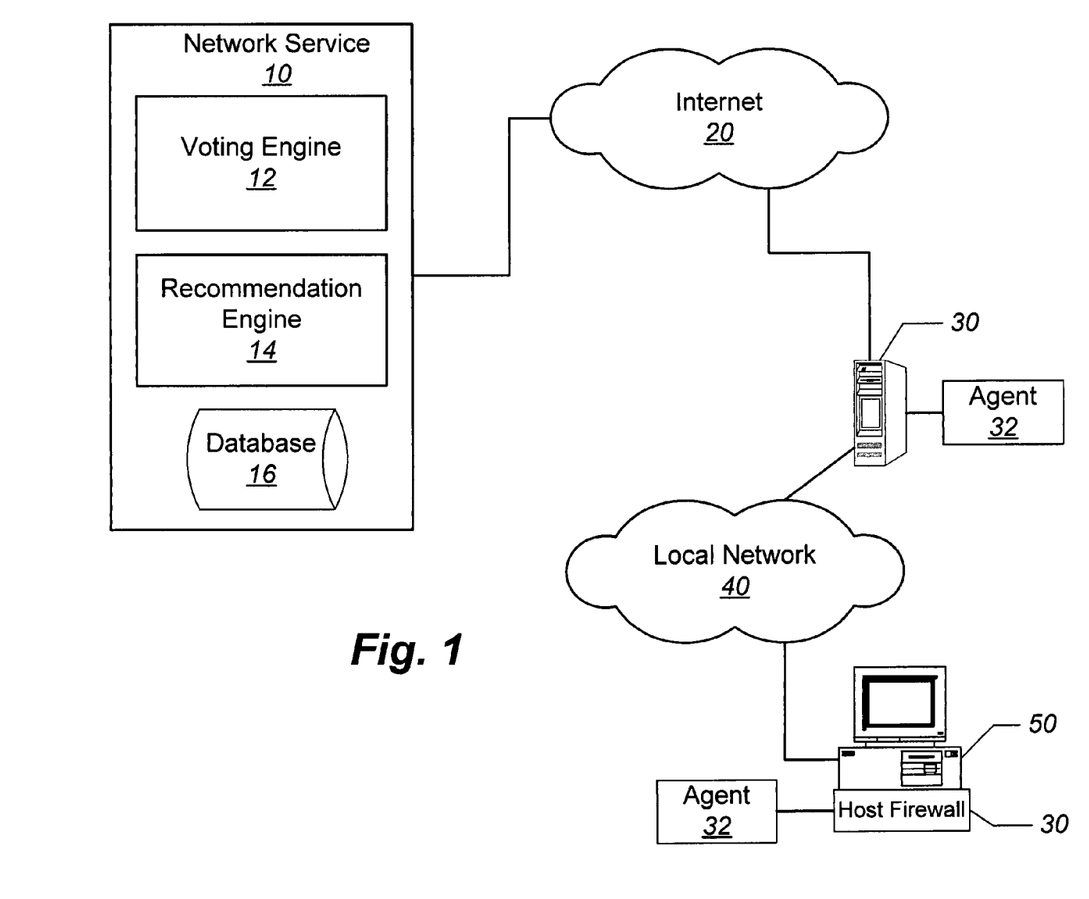
FIG. 1 is a block diagram that illustrates an exemplary network service that is configured to recommend security policies to firewalls, according to some embodiments of the present invention.

FIG. 1 is a block diagram that illustrates a network service 10 that is configured to recommend security policies to firewalls, according to some embodiments of the present invention. The term "security policy", as used herein, refers to the rules or other methods/mechanisms/techniques utilized by a firewall to determine if a particular communication through the firewall should be allowed or blocked or dropped. Conventionally, if a communication is blocked by a firewall, the originator of the communication is notified of the block. To "drop" a communication is to block the communication without providing any notification to the originator of the communication. As used herein, the term "blocked communication" will include dropped communications. As used herein, the terms "blocked" and "block" when used in reference to communications may also be understood to include meaning "dropped" and "drop," respectively.

The illustrated network service 10 is in communication with a network 20, such as the Internet. Although illustrated as connected to the Internet 20, the network service 10 may be connected to and/or accessible via various other types of networks such as intranets and other private/public communication networks. In FIG. 1, a local network 40 (e.g., an enterprise network) of computers and associated devices (collectively referred to as user devices 50) that share a common communications line or wireless link is also illustrated. Although illustrated as a personal computer (PC), the illustrated user device 50 represents any type of device that is configured to run software applications including, but not limited to, servers, personal digital assistants (PDAs), handheld computers, laptop computers, Internet-ready phones, etc. User device 50 may communicate directly with the local network 40 and other devices connected to the network 40 and/or may communicate wirelessly therewith.

FIG. 1 illustrates a network firewall 30 and a host firewall 30. As discussed above, the term "firewall" as used herein includes all types of firewalls at any location and within any device or entity. Thus, reference to firewall 30 shall include both the illustrated network firewall 30 and the host firewall 30 on a user device/server, etc. Firewall 30 includes an agent 32, downloaded from the network service 10, that is configured to collect information about communication attempts blocked by the firewall 30 and communication attempts for which the firewall 30 has no existing policy and does not know whether to allow or block (i.e., an existing security policy of the firewall 30 does not address whether to block or allow a particular communication) and to communicate this information to the network service 10. The agent 32 may collect various types of information including, but not limited to, N-tuple information (e.g., source and destination addresses of a communication, source and destination ports, communication protocol type and number), software application name, software application version, software application size, software application date, software application format, software application source, information about the data being carried or transported such as via a packet's data payload, information about the sequence of types of communications attempted, in addition to previous communications to the network and/or other devices, and logged communications between a user device 50 and other devices. (e.g., other devices in communication with the communication network 20 and/or with the local network 40), etc.

Information collected by agent 32 may be collected directly from a user device 50, from firewall 30, and/or from other devices on the local network 40 and/or on the Internet 20. In addition, agent 32 may be configured to monitor communications between a user device 50 and other devices, for example, other devices connected to the local network 40, other devices connected to the Internet 20, other devices in direct communication with device 50, etc.

In addition, agent 32 is configured to send information about communication attempts at firewall 30 to the network service 10 on a periodic basis and/or when polled by the network service 10. For example, agent 32 sends information to the network service 10 about past blocked communications and past allowed communications. This information includes information about the context of the past communications and information about the state (e.g., set of existing transiting connections, their specific types, and the status of each, etc.) of the firewall 30. The term "context", as used herein, refers to the set of circumstances in which past communications (blocked and allowed) occurred. For example, context includes firewall configuration information (e.g., the number of interfaces and/or DMZs (Demilitarized Zones) and/or zones, capacities of and/or limits and/or guarantees on bandwidths/loads, simultaneous connections supported, etc.). Context also includes perimeter security policy information (e.g., whether authentication is required, whether identification is required, security strictness, etc.), as well as information about blocking (and allowing) policy rules (e.g., explicit and broad/default rules to allow/block/drop) and includes rules associated with N-tuple information (e.g., source and destination addresses of a communication, source and destination ports, communication protocol type and number). Context can also include other security-relevant information such as the other applications used by the device, which for instance may be detected via particular aspects of communications to/from the device associated with those other applications.

According to some embodiments of the present invention, the illustrated network service 10 includes a voting engine 12, a recommendation engine 14, and a database 16 (or access to a database 16). The database 16 stores information gathered from various firewalls 30 about past communications and also includes analysis rules, such as policy-to-vote conversion rules, voting rules, context-generation rules, as will be described herein. The database 16 may also be used to log information about recommendations sent to requesting firewall agents 32 by the network service 10.

Figure 2:
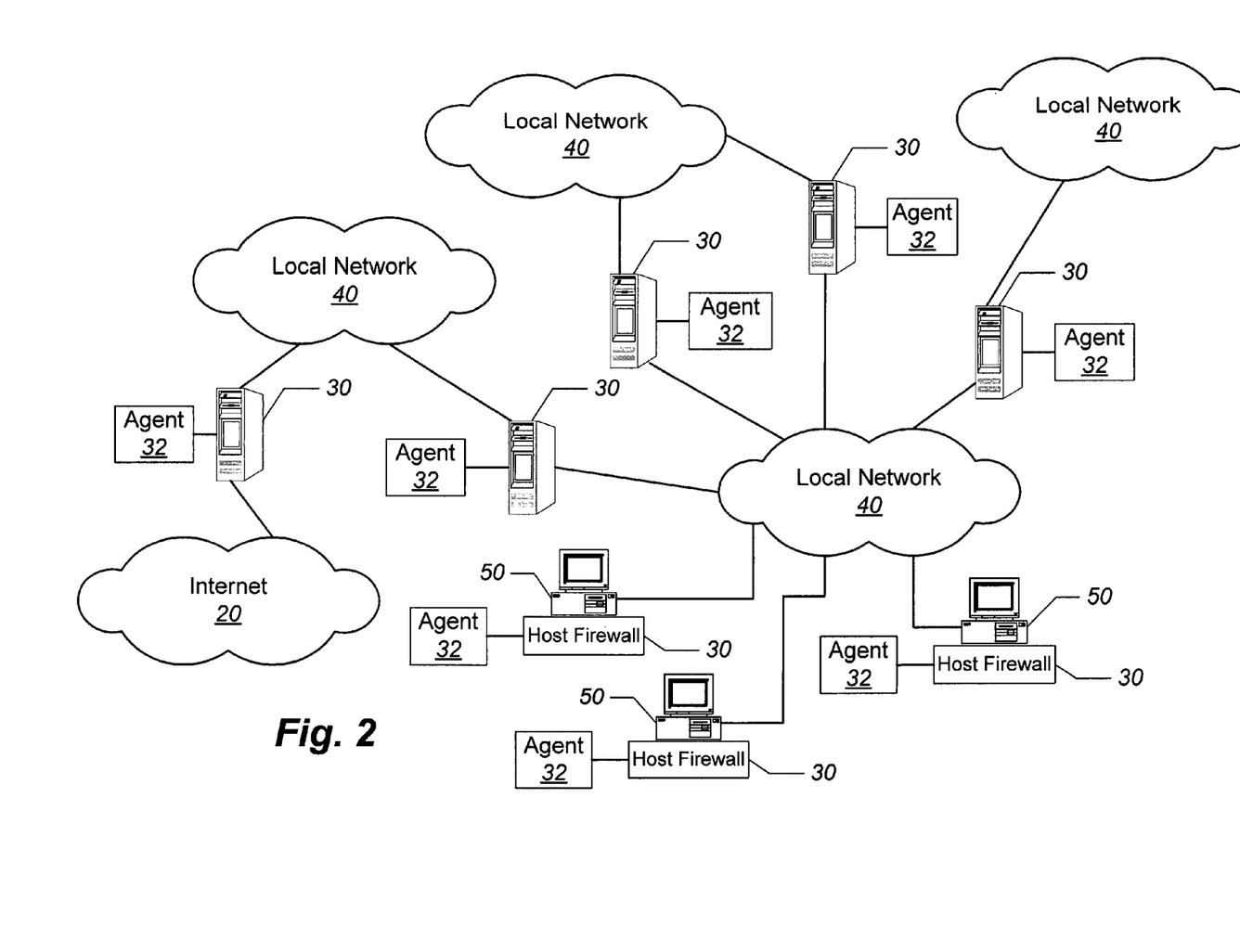
FIG. 2 is a block diagram that illustrates an exemplary communication network with multiple user devices and firewalls connected thereto and within which the network service of FIG. 1 may be utilized.

The voting engine 12 is configured to gather information from a large group of firewalls 30 (specifically from agents 32 at firewalls 30) about past blocked and allowed communications, along with other information such as may be helpful in determining contexts associated with those blocked and allowed communications. FIG. 2 illustrates an exemplary network 40 that is representative of, for example, an enterprise network with multiple departments of diverse users and various firewalls 30. With these diverse users and firewalls would likely be diverse firewall rules and policies. A voting engine 12, according to embodiments of the present invention, would gather information from as many of the illustrated firewall agents 32 as possible and from as many diverse users and diverse firewalls and/or firewall rules as possible.

The voting engine 12 categorizes gathered information about past allowed and blocked firewall communications and identifies past communications that are similar to a present communication for which a recommendation is sought by a firewall 30, as will be described below. The voting engine 12 also assigns a respective positive or negative vote to identified past communications. A positive vote indicates a respective past communication was allowed through a firewall 30 on the network 40 and a negative vote indicates a past communication was not allowed through a firewall 30 on the network 40.

Votes, both positive and negative, may be assigned a value of less than or equal to one depending on the context of a respective past communication, which for example may reflect various degrees of similarity to the context of the firewall requesting a recommendation. Votes, both positive and negative, may be assigned a value of greater than one according to some embodiments.

Similarity may be considered from a variety of perspectives, and as one example may be inferred via aspects of policy rules such "allowing" or "blocking" being explicit versus being implied or default. According to some embodiments of the present invention, a vote with a value of one may be assigned to each past communication that was blocked (or allowed) on the basis of an explicit rule at a respective firewall 30 to block (or allow) the communication. For example, if a specific type of communication, such as an FTP communication, was explicitly blocked at a firewall 30, a past FTP communication would be assigned one vote. Similarly, a vote with a value of one may be assigned to each past communication that had one or more of the following characteristics explicitly covered by a firewall blocking rule: communication source and/or destination, communication port(s), communication headers, communication data payload format, communication data, etc.

According to some embodiments of the present invention, a vote with a value of less than one (e.g., $3/4$, $1/2$, $1/4$, etc.) may be assigned to each past communication that was blocked (or allowed) on the basis of a non-explicit rule at a respective firewall (e.g., a default rule, or a communication fitting within a broad rule, etc.).

The voting engine 12 is configured to tally the positive and negative votes for identified past communications. This will serve as the basis for recommendations regarding whether to block or allow future communications at a firewall. For example, if a firewall requests a recommendation whether to block or allow a particular communication, and if the vote tally for similar past communications has negative votes outnumbering positive votes, a recommendation to block the present communication will likely be sent to the requesting firewall. This process is intended to be ongoing in that the network service 10 is continuously receiving information about past communications from various diverse firewalls, assigning votes, and tallying votes. As such, embodiments of the present invention provide a dynamic system that refines recommendations for firewalls over time.

The illustrated network service 10 also includes a recommendation engine 14 that is configured to receive requests from firewall agents 32 for a recommendation as to whether a respective firewall 30 should allow or block a detected present communication. A firewall agent 32 will generate a request for a recommendation when, for example, an existing security policy of the requesting firewall does not address whether to block or allow a particular communication. For example, if an FTP (File Transfer Protocol) communication is detected at a firewall and the existing security policy associated with the firewall 30 does not address FTP communications and the firewall does not know whether to allow the FTP communication or block the FTP communication, an agent 32 associated with the firewall 30 will send a request for a recommendation to the recommendation engine 14 of the network service 10.

The recommendation engine 14 serves as means for searching information about past blocked and allowed communications at other firewalls on a network to identify past communications that are similar to the present communication. The recommendation engine 14 makes a recommendation based on a tallied vote count for these past communications. For example, the recommendation engine 14 selects a best-match context for the recommendation request, and searches for a recommendation within that context that matches a particular communication that a recommendation is being sought for. For example, the recommendation engine 14 seeks past communications at firewalls having a similar number of policy rules and/or types of items and/or set of specific items in an existing policy as the firewall requesting a recommendation. As another example of context, the recommendation engine 14 seeks past communications at firewalls most similar to the requesting firewall and/or having a "state" (e.g., set of current internal conditions) most similar to the requesting firewall.

The recommendation engine 14, according to some embodiments of the present invention, is also configured to make "graduated" recommendations. For example, the range of possible results can be sub-divided into, for example, quartiles, wherein each quartile represents the strength of a recommendation. For example, if the tallied votes overwhelmingly indicate that past communications similar to the present communication were blocked (or allowed) by other firewalls, a "strong" recommendation is provided by the recommendation engine 14 to the requesting firewall 30. If the tallied votes moderately indicate that past communications similar to the present communication were blocked (or allowed) by other firewalls, a "moderate" recommendation is provided by the recommendation engine 14 to the requesting firewall 30. If the tallied votes only somewhat indicate that past communications similar to the present communication were blocked (or allowed) by other firewalls, a "weak" recommendation is provided by the recommendation engine 14 to the requesting firewall 30. If the tallied votes are not enough to reliably indicate that past communications similar to the present communication were blocked (or allowed) by other firewalls, a "null" recommendation is provided by the recommendation engine 14 to the requesting firewall 30.

Each agent 32 is configured to consider/implement the recommendation of the recommendation engine 14, i.e., an agent 32 modifies the blocking rules of a respective firewall 30 to block or allow a present communication and future attempts by this type of communication. In addition, an agent 32 may be configured to log a recommendation. The network service 10 may also be configured to log the recommendation, for example, within database 16.

Embodiments of the present invention are not limited to the above-delineated configurations of a network service 10 and agent(s) 32. One or more of the above-described tasks may be performed by the network service 10 and/or an agent 32. For example, an agent 32, or a user device itself, may be configured to analyze past communications blocked and allowed at other firewalls, tally votes as described above, and make recommendations regarding present communications based on best matching past communications.

Exemplary operations for recommending a security policy to a firewall regarding a present communication attempt through the firewall, according to some embodiments of the present invention, will now be described with reference to FIG. 3. Initially, a communication attempt through a firewall by a software application is detected and, for which, the firewall has no existing policy and/or does not know whether to allow or block the communication (Block 200). A request for a recommendation as to how to handle the detected communication (i.e., whether to block or allow the communication) is made (e.g., to network service 10, FIG. 1) (Block 210). Information about past blocked and allowed communications at other firewalls on the network and/or other networks is searched to identify past communications that are similar to the present communication, and then a recommendation is made based on a tallied vote count for these past communications, as described above (Block 220). The recommendation is sent to the requesting firewall (Block 230). If the recommendation is to allow the communication (Block 240), the policy at the requesting firewall is modified to allow the communication and future similar communications (Block 250). If the recommendation is to block the communication (Block 240), the policy at the requesting firewall is modified to block the communication and future similar communications (Block 260).

Figure 3:
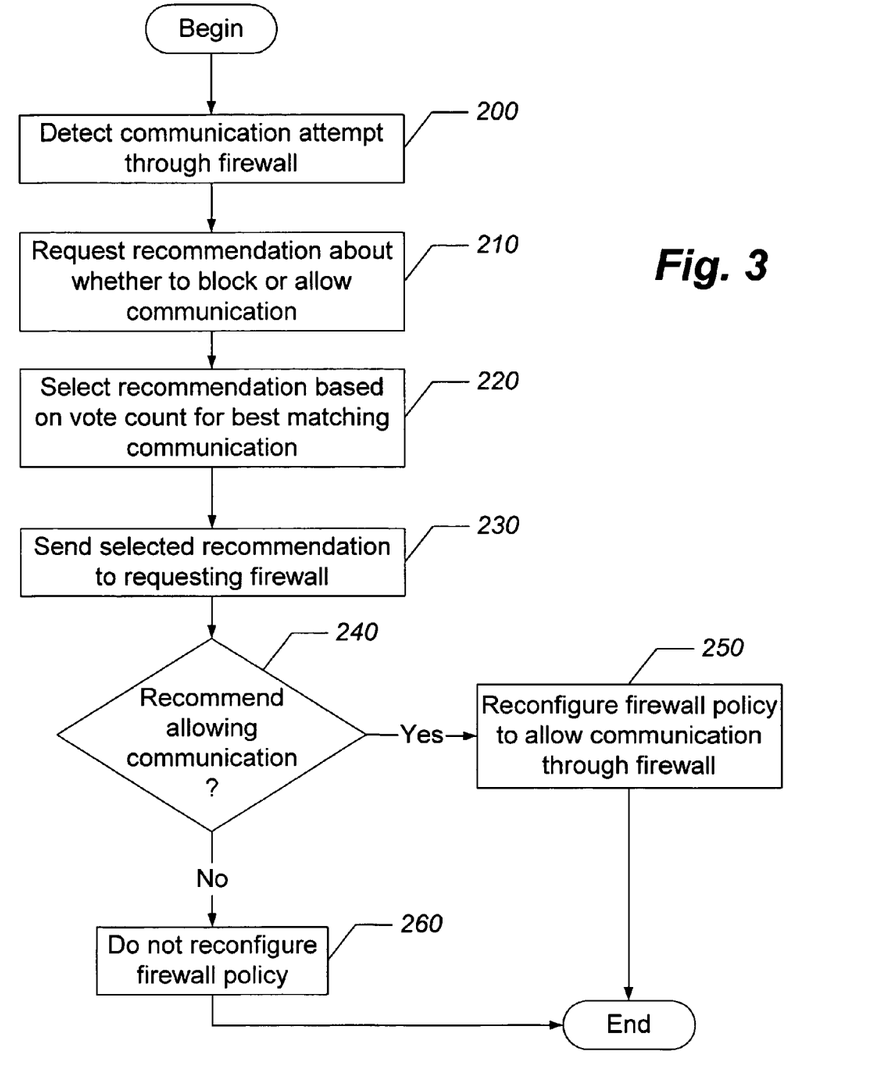
FIG. 3 is a flow chart that illustrates exemplary operations for recommending security policies to firewalls, according to some embodiments of the present invention.

FIGS. 1-3 illustrate the architecture, functionality, and operations of some embodiments of methods, systems, and computer program products for recommending security policies to firewalls. In this regard, each block represents a module, segment, or portion of code, which comprises one or more executable instructions for implementing the specified logical function(s). It should also be noted that in other implementations, the function(s) noted in the blocks may occur out of the order noted in FIG. 3. For example, two blocks shown in succession may, in fact, be executed substantially concurrently or the blocks may sometimes be executed in the reverse order, depending on the functionality involved.

EXAMPLE

Arthur is attempting to use a new file-sharing application on his PC (e.g., device 50, FIG. 1), and has previously subscribed to a security policy-recommendation service (e.g., network service 10, FIG. 1) offered by his Internet provider which installed software from its web site onto Arthur's firewall 30 (i.e., agent 32, FIG. 1) of the local network 40 to which Arthur's PC is connected. Arthur notices that his firewall initially blocks the file sharing application's communications (since he has configured his firewall to notify him of any "outgoing" connection attempts initiated from his PC that it blocks). Or, alternatively, Arthur notices that his file sharing program does not initially seem to be working, since it does not initially seem to be connecting through to the Internet (20, FIG. 1), but rather there is a slightly noticeable delay.

The firewall agent (32, FIG. 1) collects relevant information about the file sharing application's communication, including context-related such as a subset of the firewall's "state". The firewall agent (32, FIG. 1) sends the relevant information to a recommendation engine (14, FIG. 1), which applies rules and utilizes the information to determine that it appears a new file sharing application is attempting to communicate, in a particular context.

A voting engine (12, FIG. 1) has previously received policy info from a large group of firewalls (with a large group of associated diverse users/operators), has converted the elements within those policy sets into votes, has generated a set of contexts to reflect the wide set of circumstances present in the large group, has placed the votes into contexts, and has tallied the votes for each specific case within each specific context. Further, the voting engine (12, FIG. 1) has previously provided the recommendation engine with those voting results, for each context considered.

The recommendation engine (14, FIG. 1), using rules with inputs from the provided information, selects a best-match context for the recommendation request, and searches for a recommendation within that context that matches the particular communication that was blocked by Arthur's firewall (30, FIG. 1). Not finding a matching recommendation, the recommendation engine (14, FIG. 1) searches within several next-closest contexts, finds a matching result to "strongly" allow the communication, and sends this recommendation to the requesting firewall agent (32, FIG. 1). Arthur's firewall agent (32, FIG. 1), upon receiving the recommendation, and noting that it is a "strong" recommendation, decides to, and does, modify its blocking policy to un-block, and thus allow, the file sharing application's communications.

Many variations and modifications can be made to the preferred embodiments without substantially departing from the principles of the present invention. All such variations and modifications are intended to be included herein within the scope of the present invention, as set forth in the following claims.

That which is claimed:

1. A method of recommending a security policy to a firewall, the method comprising:

receiving, by a network service connected to a firewall via an internet, a request from the firewall for a recommendation as to whether the firewall should block a detected present communication;

determining whether an existing security policy addresses whether to block the communication;

in response to determining that no existing security policy addresses whether to block the communication, searching, at the network service, information about past blocked and allowed communications at other firewalls on the network that have corresponding policy rules and a corresponding state as the requesting firewall to identify past communications that are corresponding to the communication, wherein identified past communications are assigned a respective positive or negative vote, wherein the positive vote indicates a respective past communication was allowed through a firewall on the network and wherein the negative vote indicates a past communication was not allowed through a firewall on the network, and wherein a value of the respective positive and negative vote is less than or equal to one depending on a context of a respective past communication, which reflects various degrees of similarity to the context of the firewall requesting a recommendation so as to indicate how similar identified past communications are to a detected present communication; and sending, from the network service to the requesting firewall, one of the following graduated recommendations a positive recommendation to the requesting firewall: a strong positive recommendation to allow that the present communication allowed if the positive votes overwhelmingly outnumber the negative votes, a moderate positive recommendation to allow the communication if the positive votes moderately outnumber the negative votes, a weak positive recommendation to allow the communication if the positive votes only somewhat outnumber the negative votes, a null recommendation if the positive votes are not enough to reliably indicate that the communication be allowed.

2. The method of claim 1, wherein the request includes at least one of the following types of information about the communication selected from the group consisting of: source and destination addresses of the communication, source and destination ports, communication protocol type and number, software application name, software application version, software application size, software application date, software application format, software application source, and logged communications between the user device and other devices.

3. A network service that recommends security policies to firewalls, the network service comprising:
   a processor;
   memory coupled to the processor; and
   computer program code residing in the memory that, when executed by the processor, causes the processor to perform the following:
   receive a request from a firewall, connected to the network service via an internet, for a recommendation as to whether the firewall should block a detected present communication;
   determine whether an existing security policy addresses whether to block the communication;
   in response to determining that no existing security policy addresses whether to block the communication, search information about past blocked and allowed communications at other firewalls on the network that have corresponding policy rules and a corresponding state as the requesting firewall to identify past communications that are corresponding to the present communication, wherein identified past communications are assigned a respective positive or negative vote, wherein the positive vote indicates a respective past communication was allowed through a firewall on the network and wherein the negative vote indicates a past communication was not allowed through a firewall on the network, and wherein a value of the respective positive and negative vote is less than or equal to one depending on a context of a respective past communication, which reflects various degrees of similarity to the context of the firewall requesting a recommendation so as to indicate how similar identified past communications are to a detected present communication;
   tally the positive and negative votes for the identified past communications; and
   send one of the following graduated recommendations a positive recommendation to the requesting firewall: a strong positive recommendation to allow that the present communication if the positive votes overwhelmingly outnumber the negative votes, a moderate positive recommendation to allow the communication if the positive votes moderately outnumber the negative votes, a weak positive recommendation to allow the communication if the positive votes only somewhat outnumber the negative votes, a null recommendation if the positive votes are not enough to reliably indicate that the communication be allowed.

4. The network service of claim 3, wherein the request includes at least one of the following types of information about the communication selected from the group consisting of: source and destination addresses of the communication, source and destination ports, communication protocol type and number, software application name, software application version, software application size, software application date, software application format, software application source, and logged communications between the user device and other devices.

5. The network service of claim 3, further comprising computer program code residing in the memory that, when executed by the processor, causes the processor to gather information about past blocked and allowed communications at other firewalls on the network.

6. The network service of claim 3, further comprising a respective agent located at the other firewalls, wherein each respective agent is configured to send information about past blocked and allowed communications at a respective firewall on the network.

7. The network service of claim 3, further comprising an agent located at the requesting firewall that is configured to send the request.

8. A computer program product that recommends security policies to firewalls, comprising a non-transitory computer readable storage medium having computer readable program code embodied therein that, when executed on a computer, causes the computer to perform the following:
   receive, by a network service connected to a firewall via an internet, a request from the firewall for a recommendation as to whether the firewall should block a detected present communication;
   determining whether an existing security policy addresses whether to block the communication;
   in response to determining that no existing security policy addresses whether to block the communication, search, at the network service, information about past blocked and allowed communications at other firewalls on the network that have corresponding policy rules and a corresponding state as the requesting firewall to identify past communications that are corresponding to the communication, wherein identified past communications are assigned a respective positive or negative vote, wherein the positive vote indicates a respective past communication was allowed through a firewall on the network and wherein the negative vote indicates a past communication was not allowed through a firewall on the network, and wherein a value of the respective positive and negative vote is less than or equal to one depending on a context of a respective past communication, which reflects various degrees of similarity to the context of the firewall requesting a recommendation so as to indicate how similar identified past communications are to a detected present communication;

tally the positive and negative votes for the identified past communications; and send, from the network service to the requesting firewall, one of the following graduated recommendations to the requesting firewall: a strong positive recommendation to allow the communication if the positive votes overwhelmingly outnumber the negative votes, a moderate positive recommendation to allow the communication if the positive votes moderately outnumber the negative votes, a weak positive recommendation to allow the communication if the positive votes only somewhat outnumber the negative votes, a null recommendation if the positive votes are not enough to reliably indicate that the communication be allowed.

* * * * *